(12) United States Patent
Meixner

(10) Patent No.: US 10,308,105 B2
(45) Date of Patent: Jun. 4, 2019

(54) DRIVE DEVICE FOR A HYBRID-DRIVEN MOTOR VEHICLE

(71) Applicant: AUDI AG, Ingolstadt (DE)

(72) Inventor: Christian Meixner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 105 days.

(21) Appl. No.: 15/100,061

(22) PCT Filed: Nov. 11, 2014

(86) PCT No.: PCT/EP2014/003020
§ 371 (c)(1),
(2) Date: May 27, 2016

(87) PCT Pub. No.: WO2015/078559
PCT Pub. Date: Jun. 4, 2015

(65) Prior Publication Data
US 2017/0259662 A1    Sep. 14, 2017

(30) Foreign Application Priority Data

Nov. 28, 2013 (DE) .................. 10 2013 019 901

(51) Int. Cl.
*B60K 6/52* (2007.10)
*B60K 17/35* (2006.01)
(Continued)

(52) U.S. Cl.
CPC .............. *B60K 6/52* (2013.01); *B60K 6/387* (2013.01); *B60K 6/40* (2013.01); *B60K 6/405* (2013.01);
(Continued)

(58) Field of Classification Search
None
See application file for complete search history.

(56) References Cited

U.S. PATENT DOCUMENTS

| 6,533,692 B1 * | 3/2003 | Bowen | B60K 6/26 475/5 |
| 7,191,859 B2 * | 3/2007 | Hashimoto | B60K 6/24 180/65.25 |

(Continued)

FOREIGN PATENT DOCUMENTS

| CN | 101801701 | 8/2010 |
| CN | 102947622 | 2/2013 |

(Continued)

OTHER PUBLICATIONS

International Search Report issued by the European Patent Office in International Application PCT/EP2014/003020.
(Continued)

*Primary Examiner* — Mark A Manley
(74) *Attorney, Agent, or Firm* — Henry M. Feiereisen LLC

(57) ABSTRACT

The invention relates to a drive device for a hybrid-drive motor vehicle, having an internal combustion engine (12), a variable-speed transmission (14), and an electric machine (32) connected downstream of the variable-speed transmission (14). According to the invention the electric machine (32) is arranged in the motor vehicle as an independent structural unit (16) and is connected by at least one connecting shaft (20, 46) to one of the shafts (38, 40) of the variable-speed transmission (14).

6 Claims, 4 Drawing Sheets

(51) Int. Cl.
- *B60K 6/387* (2007.10)
- *B60K 6/54* (2007.10)
- *B60K 17/356* (2006.01)
- *B60K 6/40* (2007.10)
- *B60K 6/405* (2007.10)
- *B60K 6/48* (2007.10)

(52) U.S. Cl.
CPC ............. *B60K 6/48* (2013.01); *B60K 6/54* (2013.01); *B60K 17/35* (2013.01); *B60K 17/356* (2013.01); *B60K 2006/4808* (2013.01); *B60K 2006/4825* (2013.01); *B60Y 2200/92* (2013.01); *B60Y 2400/82* (2013.01); *Y02T 10/626* (2013.01); *Y02T 10/6221* (2013.01); *Y02T 10/6252* (2013.01); *Y02T 10/6265* (2013.01); *Y10S 903/914* (2013.01); *Y10S 903/916* (2013.01); *Y10S 903/951* (2013.01)

(56) References Cited

U.S. PATENT DOCUMENTS

| | | | |
|---|---|---|---|
| 8,020,654 B2 * | 9/2011 | Muller | B60K 6/365 |
| | | | 180/65.6 |
| 8,727,927 B2 | 5/2014 | Meixner | |
| 9,561,719 B2 * | 2/2017 | Lo | B60L 11/12 |
| 2003/0148843 A1 | 8/2003 | Bowen | |
| 2003/0234124 A1 * | 12/2003 | Pecnik | B60K 6/26 |
| | | | 180/65.25 |
| 2005/0037883 A1 * | 2/2005 | Motoike | B60K 6/26 |
| | | | 475/5 |
| 2006/0169502 A1 | 8/2006 | Kano et al. | |
| 2011/0118072 A1 | 5/2011 | Hashimoto et al. | |
| 2011/0168468 A1 * | 7/2011 | Taguchi | B60K 1/02 |
| | | | 180/65.245 |

FOREIGN PATENT DOCUMENTS

| | | |
|---|---|---|
| DE | 42 11 586 | 10/1993 |
| DE | 4211586 | * 10/1993 |
| DE | 10 2006 005 095 | 8/2007 |
| DE | 10 2007 036 098 | 2/2009 |
| DE | 10 2007 051 991 | 5/2009 |
| DE | 10 2010 060 493 | 5/2011 |
| EP | 1 640 202 | 11/2011 |
| FR | 2 766 133 | 1/1999 |
| GB | 1014030 | 12/1965 |
| JP | 7-228156 | * 8/1995 |
| WO | WO2013/113103 | * 8/2013 |

OTHER PUBLICATIONS

Chinese Search Report, dated Dec. 1, 2017 with respect to counterpart Chinese patent application 201480064974.4.

Translation of Chinese Search Report dated Dec. 1, 2017 with respect to counterpart Chinese patent application 201480064974.4.

* cited by examiner

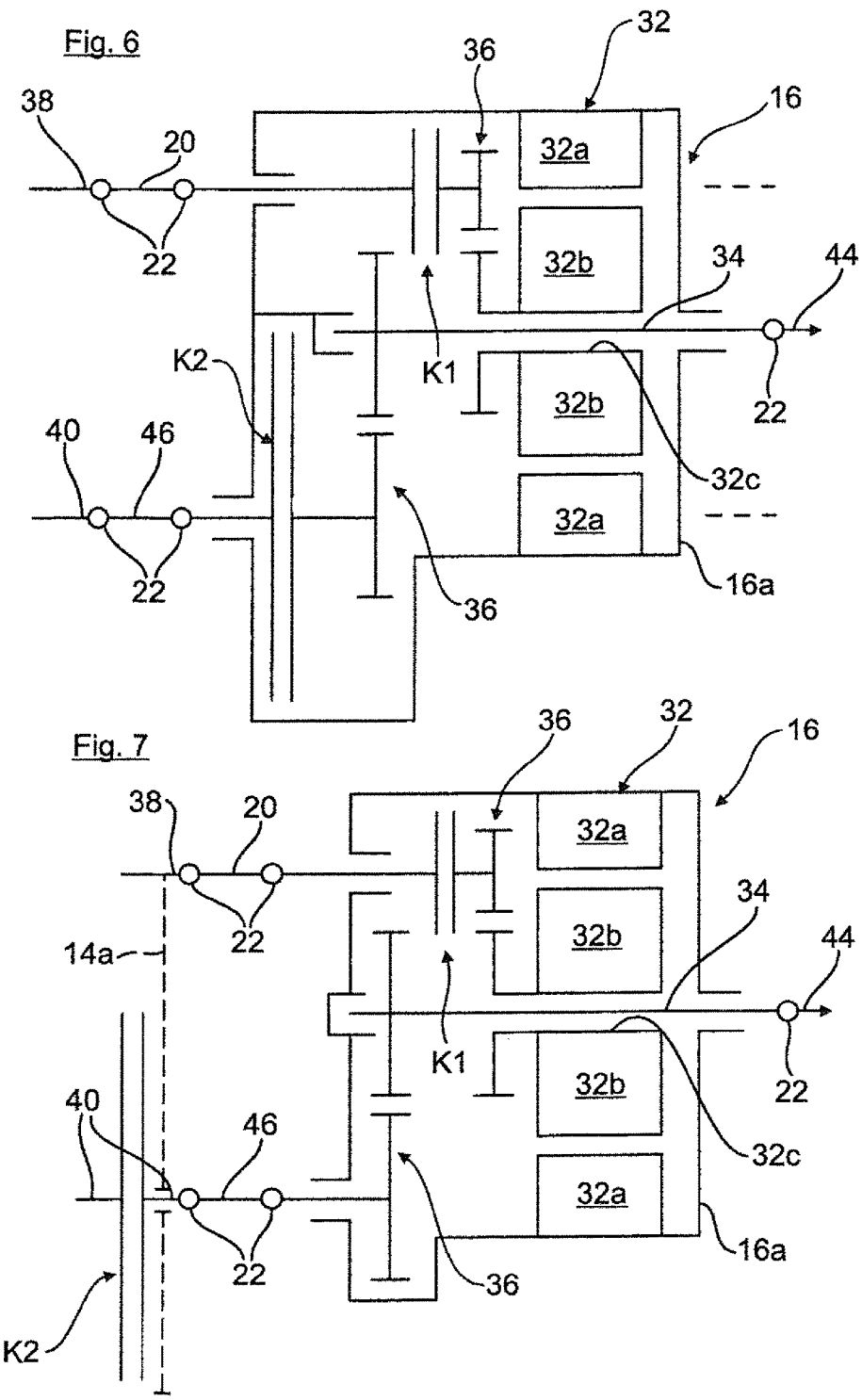

DRIVE DEVICE FOR A HYBRID-DRIVEN MOTOR VEHICLE

CROSS-REFERENCES TO RELATED APPLICATIONS

This application is the U.S. National Stage of International Application No. PCT/EP2014/003020, filed Nov. 11, 2014, which designated the United States and has been published as International Publication No. WO 2015/078559 and which claims the priority of German Patent Application, Serial No. 10 2013 019 901.8, filed Nov. 28, 2013 pursuant to 35 U.S.C. 119(a)-(d).

BACKROUND OF THE INVENTION

The present invention relates to a drive device for a hybrid-driven motor vehicle according to the preamble of patent claim 1.

A drive device of the generic type is disclosed, for example, in DE 10 2007 036 098 A1, in which in a standard drive for motor vehicles an electric machine is integrated in a cardan shaft which is routed from a front variable-speed transmission or its output shaft to a rear axle differential. Further integrated in the housing of the electric machine is a reducing planetary transmission via which the rotor of the electric machine, which rotor is arranged on a hollow shaft, is in driving relation with the cardan shaft or can be driven via the cardan shaft to act as generator.

SUMMARY OF THE INVENTION

The object of the invention is to provide a drive device of a type involved here, which can be used for motor vehicle drives with or without cardan shaft and allows greater design freedom and more universal range of applications.

The object is achieved by a drive device for a hybrid-driven motor vehicle with an internal combustion engine, a variable-speed transmission and an electric machine arranged downstream of the variable-speed transmission, wherein the electric machine is arranged in an independent structural unit in the motor vehicle and operably connected with at least one connecting shaft to one of the shafts of the variable-speed transmission.

Advantageous refinements of the invention are subject matter of the dependent claims.

In accordance with the invention, it is proposed to arrange the electric machine as an independent structural unit in the motor vehicle and to connect it with at least one connecting shaft to one of the shafts of the variable-speed transmission. It is particularly preferred for this purpose that the electric machine can be positioned in a central longitudinal tunnel of the underbody of the motor vehicle. The structural unit can thus be easily installed and respectively suited, depending on given requirements, to the variable-speed transmission and thus is able to use associated desired transmission ratios in the variable-speed transmission. The electric machine can power the motor vehicle alone or in hybrid mode with the internal combustion engine, or operate as generator to generate electric power in recuperation mode or via the internal combustion engine and/or be used as a starter motor.

For this purpose, the shaft of the electric machine can be coupled via a gear stage to the connecting shaft. This has the advantage that the electric machine can be positioned offset to the connecting shaft, thereby considerably facilitating the arrangement of the structural unit within the central longitudinal tunnel; Moreover, the transmission ratio from the electric machine to the transmission shaft can be changed in a deliberate manner via the gear stage.

Further, it may be expedient, when the rotor of the electric machine and/or the gear stage can be decoupled from the variable-speed transmission via a clutch integrated in the structural unit. As a result, efficiency can be improved, when the motor vehicle is powered solely via the combustion engine by shutting down the electric machine.

The shaft of the variable-speed transmission, which shaft is coupled with the connecting shaft, may be the input shaft of the variable-speed transmission so that the connecting shaft rotates analogous to the speed of the internal combustion engine, and thus all transmission stages of the variable-speed transmission can also be utilized for the electric machine.

As an alternative, the shaft of the variable-speed transmission, coupled with the connecting shaft, can be the output shaft of the variable-speed transmission, wherein provision may be made between the gear stage and the shaft of the electric machine for one or more shiftable transmission stages by which the speed of the electric machine can be suited in a beneficial manner to the travel speed of the motor vehicle or its drive torque can be adjusted.

When a motor vehicle with front-wheel drive unit and rear-wheel drive is involved, in which the output shaft of the variable-speed transmission is in driving relation via a cardan shaft with the rear axle differential, the force flow to the rear axle differential can, preferably, be established via an intermediate shaft, which is led through the hollow shaft of the electric machine and which is in driving relation with both the rotor of the electric machine and the driving cardan shaft.

Particularly preferred, however, is a proposal in which the force flow, when a motor vehicle with front-wheel drive unit and rear-wheel drive, in which the output shaft of the variable-speed transmission is in driving relation via a cardan shaft with the rear axle differential, is established via the connecting shaft, connected to the input shaft of the variable-speed transmission, and the force flow to the cardan shaft is established via a second connecting shaft, connected to the output shaft of the variable-speed transmission, and an intermediate shaft, with the intermediate shaft being led through a hollow shaft of the electric machine. The electric machine thus is in driving relation with the input shaft of the variable-speed transmission, while the output shaft of the variable-speed transmission extends through the rotor of the electric machine in a structurally beneficial manner to drive the rear axle differential. To adjust the transmission ratios, in particular however to realize beneficial axle distances of the shafts in the structural unit, the second connecting shaft, connected with the output shaft, is able to act via a second gear stage upon the intermediate shaft.

According to an advantageous refinement of the invention, the force flow from the rear opposite output shaft of the variable-speed transmission to the rear axle differential can be cut by a clutch, when an all-wheel drive of the motor vehicle is involved with variable-speed transmission in driving relation to a front axle differential. Thus, the all-wheel drive can be disabled when operated in combustion engine mode, in hybrid mode, and in electromotive mode, and the motor vehicle can be powered at improved efficiency solely by the front-wheel drive (for example, when higher vehicle speeds are involved). The clutch may hereby, preferably, be integrated into the structural unit with the electric machine.

Finally, it is proposed in particular for efficiency reasons that the clutch between the electric machine and the first connecting shaft and/or the clutch between the second connecting shaft and the cardan shaft are respectively connected upstream of the corresponding gear stage, so that no force flow or drive torque is established via the gear stages and optional downstream transmission elements, when the respective clutches are disengaged.

BRIEF DESCRIPTION OF THE DRAWING

Several exemplary embodiments of the invention are described in greater detail hereinafter with reference to the accompanying schematic drawing.

It is shown in:

FIG. 6 a structural unit, as an alternative to the one in FIG. 5, with two clutches which are integrated into the structural unit and by means of which the electric machine and the driving cardan shaft can be decoupled in the force flow from upstream gear stages; and FIG. 7 a further configuration of the structural unit, as an alternative to the one in FIG. 5, with the electric machine and two connecting shafts to the variable-speed transmission, wherein the clutch, which disengages the rear-wheel drive, is arranged within the variable-speed transmission on the output shaft.

DETAILED DESCRIPTION OF PREFERRED EMBODIMENTS

Figure 1:
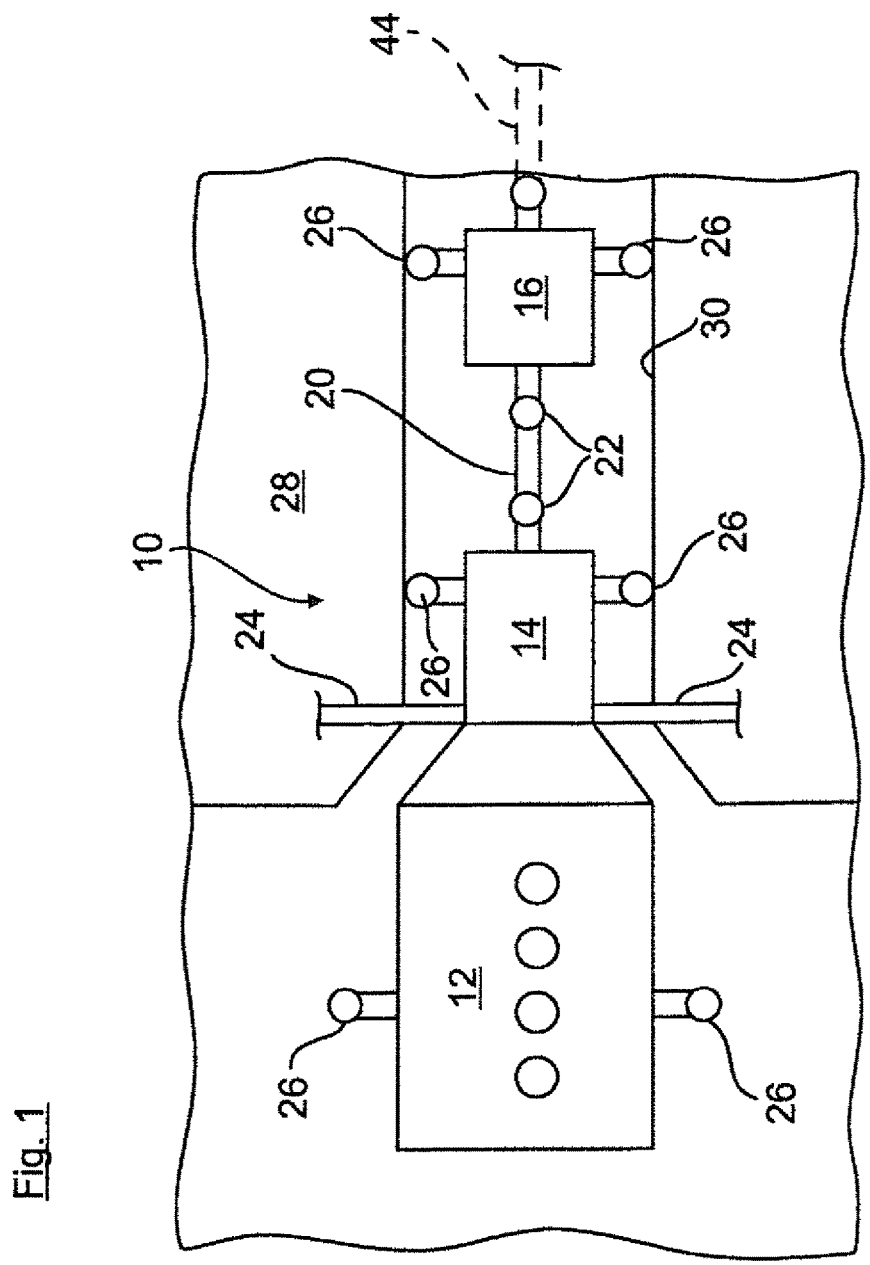
FIG. 1 a plan view of a drive device of a front-wheel driven motor vehicle with an internal combustion engine, a variable-speed transmission, and a structural unit connected via a connecting shaft to the variable-speed transmission and having an electric machine.

FIG. 1 illustrates, by way of a plan view and roughly schematically, a hybrid drive device 10 for a motor vehicle with front-wheel drive. The hybrid drive device essentially includes an internal combustion engine 12, a variable-speed transmission 14, and an electric machine 32 (FIG. 2 and following) which is arranged in an independent structural unit 16. The internal combustion engine 12 and the variable-speed transmission 14 may be of known construction and are therefore not described further.

The structural unit 16 is drivingly connected via a connecting shaft 20 with the variable-speed transmission 14, wherein joints 22 are provided in the connecting shaft 20 in view of the non-aligned shaft rotation axes. In the exemplary embodiment, a front axle differential is integrated in a manner known per se within the variable-speed transmission 14 to drive the front wheels of the motor vehicle via drive shafts 24, The internal combustion engine 12, the variable-speed transmission 14, and the structural unit 16 are secured by indicated mountings 26 to the motor vehicle body, with the structural unit 16 being positioned within the central longitudinal tunnel 30 arranged on the underbody 28.

Figure 2:
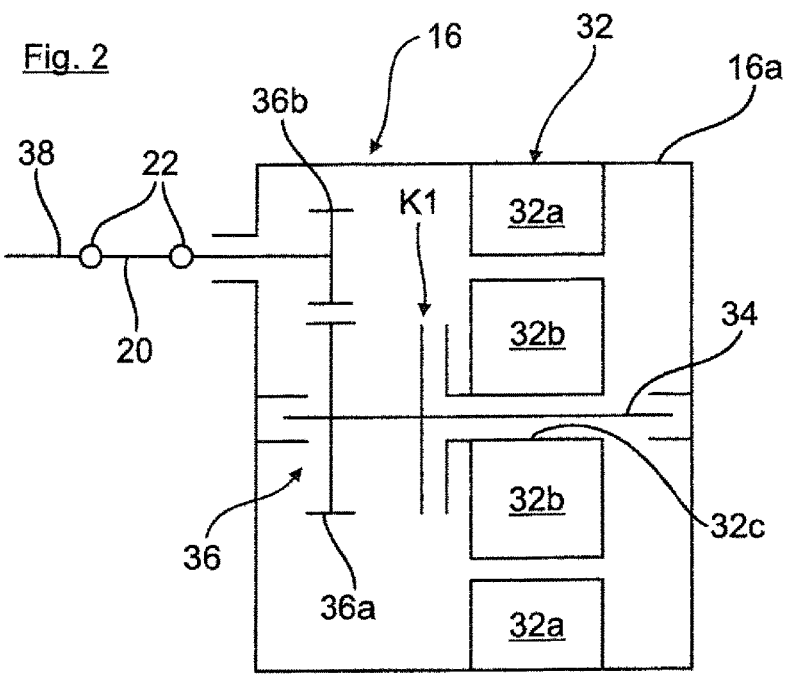
FIG. 2 the structural unit with the electric machine of FIG. 1 by way of a block diagram, in which the connecting shaft is connected to the input shaft of the variable-speed transmission.

FIG. 2 shows by way of a block diagram the configuration of the structural unit 16, which has a housing 16a in which the electric machine 32 having an annular stator 32a and an annular rotor 32b is arranged.

The rotor 32b includes hereby a hollow shaft 32c, which is guided on an intermediate shaft 34 which is rotatably mounted in the housing 16a and supports a clutch K1 (for example, a hydraulically-controlled multiple disc clutch or a synchronizing clutch) via which the rotor 32b can be coupled to the intermediate shaft 34.

The intermediate shaft 34 is connected in driving relation via an integrated gear stage 36 with gears 36a, 36b with the connecting shaft 20, which, in turn, is connected to the input shaft 38 (only indicated) of the variable-speed transmission 14. It should be noted that the variable-speed transmission 14 is modified accordingly, and that said input shaft 38 is led out of the transmission housing of the variable-speed transmission 14 to the rear and is connected via suitable connections (plug connection or flanges) with the connecting shaft 20.

The structural unit 16 is configured in terms of the transmission such that the input shaft 38 of the variable-speed transmission 14 can be driven via the electric machine 32, when the clutch K1 is engaged, and the front wheels of the motor vehicle can be driven via the inner transmission ratios of the variable-speed transmission and the integrated output shaft. When operating as generator, the on-board power supply or the traction battery of the motor vehicle can be supplied with electrical power in recuperation mode or via the coupled internal combustion engine 12. Furthermore, the internal combustion engine 12 may, optionally, be started (variable-speed transmission shifted to neutral).

Furthermore, the electric machine 32 can be decoupled from the connecting shaft 20 or from the variable-speed transmission 14, by opening the clutch K1.

Figure 3:
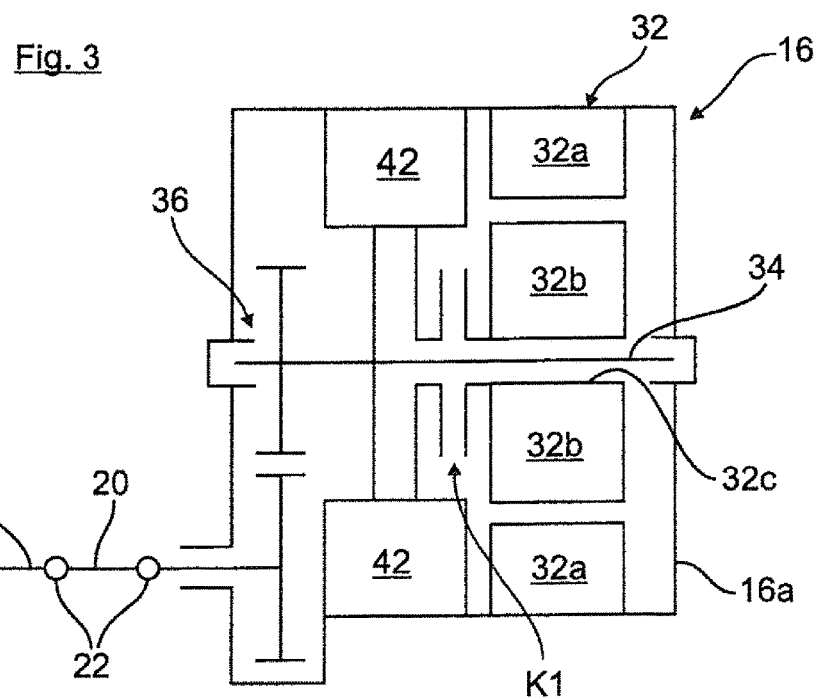
FIG. 3 a structural unit, as an alternative to FIG. 2, in which the electric machine is in driving relation via shiftable transmission stages to the connecting shaft connected to the output shaft of the variable-speed transmission.

FIG. 3 shows a configuration of the structural unit 16, as an alternative to FIG. 2. Functionally identical parts are provided with same reference numerals. The description is limited to essential differences to avoid repetitions. The same applies to the further following figure descriptions.

According to FIG. 3, the connecting shaft 20 of the structural unit 16 is connected to the only indicated output shaft 40 of the variable-speed transmission 14, which output shaft thus extends out of the housing of the variable-speed transmission 14 and is provided with connections (plug connection or connection flange).

The connecting shaft 20 is drivingly connected via the gear stage 36 with the intermediate shaft 34, with the intermediate shaft 34 being coupled to the rotor 32b of the electric machine 32, not directly (similar to FIG. 2), but via a shifting device 42 (this may, for example, be a dual synchronizing clutch as known in manual transmissions, or a planetary transmission), which forms at least two transmission stages.

Using, for example, the electromechanically switchable shifting device 42, the electric machine 32 can, preferably, be switched for starting the motor vehicle and in the lower speed range to a shorter gear ratio (higher torque) and in the higher speed range to a longer gear ratio. Otherwise, the function of the electric machine 32 is as described with respect to FIG. 2, wherein again the front wheels of the motor vehicle are driven via the output shaft 40 and the axle differential integrated in the variable-speed transmission 14.

Figure 4:
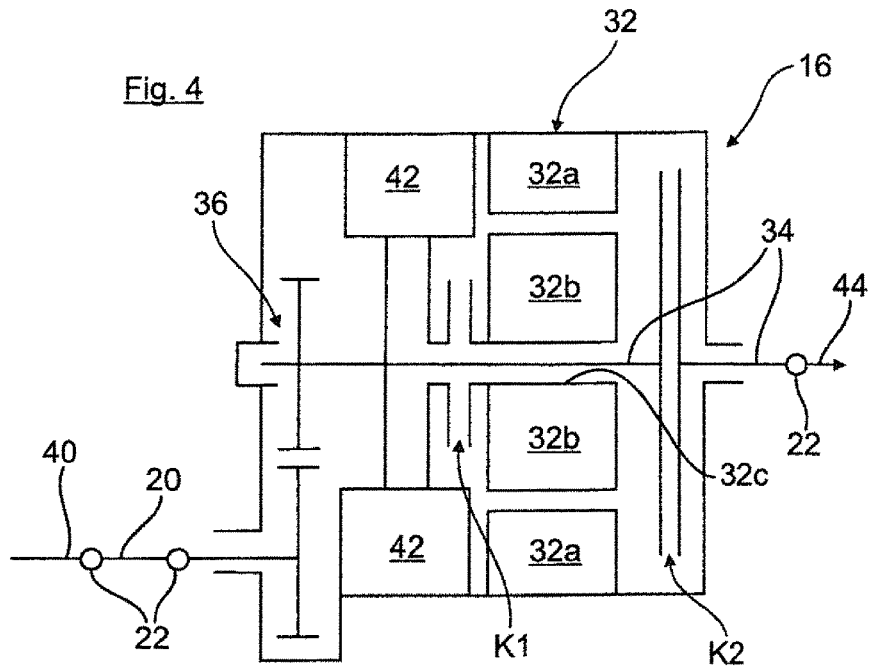
FIG. 4 a further block diagram of a structural unit with electric machine, in which the electric machine and a driving cardan shaft for an additional rear-wheel drive of the motor vehicle are coupled via an intermediate shaft to the output shaft of the variable-speed transmission.

FIG. 4 illustrates a structural unit 16, which differs essentially from the one in FIG. 3 in that the intermediate shaft 34 is guided out of the housing 16a via an integrated clutch K2 (which may, preferably, be a hydraulically-controlled multiple disc clutch) and drivingly connected with a cardan shaft 44 (only indicated). A rear axle differential or the rear wheels can be driven in addition to the front wheels of the motor vehicle via the cardan shaft 44 in a manner known per se.

The rear-wheel drive can be disengaged by the clutch K2, which is particularly advantageous for efficiency reasons, when higher vehicle speeds are involved. As an alternative, the activation of the rear-wheel drive may also be controlled in dependence on slip values on the wheels of the motor vehicle or controlled in other ways.

Figure 5:
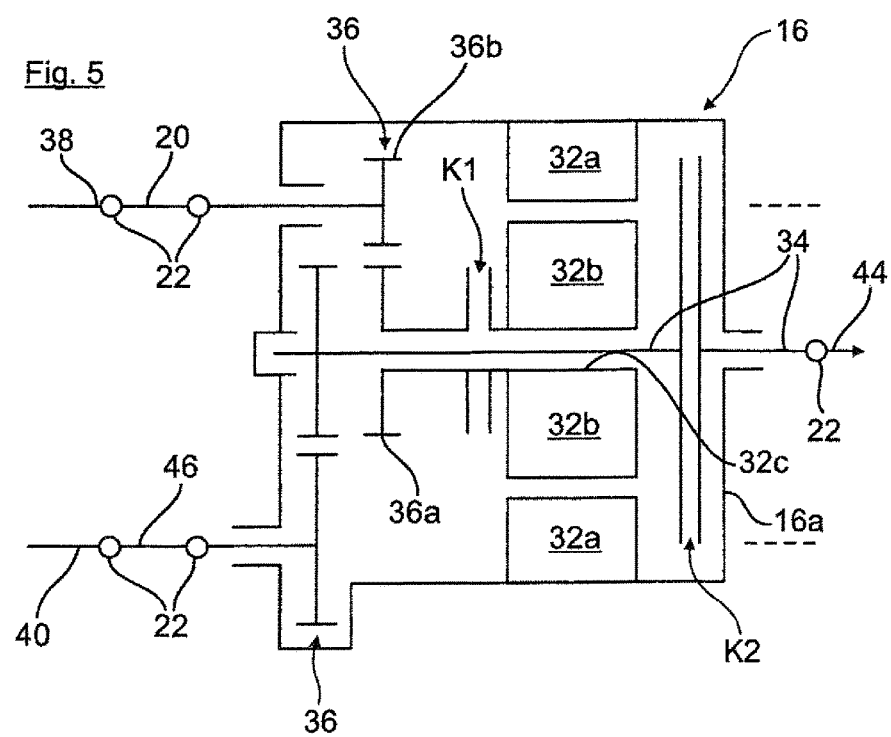
FIG. 5 a configuration of the structural unit which differs from the one in FIG. 4, wherein the electric machine is connected via a first connecting shaft and the driving cardan shaft is connected via a second connecting shaft to the input shaft and the output shaft of the variable-speed transmission.

FIG. 5 shows a further, particularly preferred, embodiment of the structural unit 16, with the main difference being that here the electric machine 32 is connected via a first connecting shaft 20, analogous to FIG. 2, to the input shaft 38 of the variable-speed transmission 14, whereas the intermediate shaft 34, analogous to FIG. 4, is drivingly connected with the output shaft 40 of the variable-speed transmission 14 via a second connecting shaft 46.

The output shaft 40 of the variable-speed transmission 14 is hereby in driving relation via the connecting shaft 46 and the gear stage 36 with the intermediate shaft 34 and the latter via the clutch K2 with the cardan shaft 44.

Conversely, the input shaft 38 of the variable-speed transmission 14 is coupled via the connecting shaft 20 and also an axially offset gear stage 36 (the two gear stages 36 may be different in their gear ratios) and via the clutch K1 with the rotor 32b of the electric machine 32.

The gear 36a of the gear stage 36 and the clutch K1, like the hollow shaft 32c of the rotor 32b, are hereby rotatable relative to the intermediate shaft 34 and supported on the intermediate shaft 34 or decoupled therefrom.

As a result, the electric machine 32, as described with reference to FIG. 2, can be in driving relation with the input shaft 38 of the variable-speed transmission 14, while the rear wheels of the motor vehicle can be driven via the output shaft 40 and the decoupled intermediate shaft 34.

FIGS. 6 and 7 show, as an alternative to FIG. 5, configurations of the structural unit 16, with the arrangements of the clutches K1 and K2 being designed differently here.

The clutch K1 is arranged in FIGS. 6 and 7 between the connecting shaft 20 and the gear stage 36, so that the force flow to the electric machine 32 is interrupted or no torque or drag torque acts via the gear stage 36 to the electric machine 32, when the clutch K1 is disengaged.

Furthermore, according to FIG. 6, the coupling K2 is positioned between the connecting shaft 46 and the corresponding gear stage 36 within the housing 16a of the structural unit 16, so that the gear stage 36 is relieved, when the clutch K2 is again disengaged (disconnected rear axle).

Deviating from FIG. 6, the clutch K2 (only indicated), according to FIG. 7, can be arranged outside the structural unit 16 within the transmission housing 14a of the variable-speed transmission 14 and can thus directly uncouple the portion of the output shaft 40 that extends out of the transmission housing 14a.

The invention is not limited to the illustrated exemplified embodiments. In particular, depending on the type of drive (front-wheel drive, rear-wheel drive, or all-wheel drive) modifications in the structural unit 16, as familiar to the artisan, are possible, resulting in modifications to the illustrated drawings.

The structural unit 16 may be arranged within the central longitudinal tunnel 30 (FIG. 1) in such a preferred manner that a possibly existing cross member or assembly beam can be used for its securement. The separate arrangement of the structural unit 16 relative to the variable-speed transmission 14 results in a smoothly running, low-vibration arrangement which may also be placed in a beneficial manner spatially on the underbody of the vehicle and within the central longitudinal tunnel 30.

The invention claimed is:

1. A drive device for a hybrid-driven motor vehicle, comprising:
   an internal combustion engine;
   a variable-speed transmission;
   an independent structural unit arranged downstream of the variable-speed transmission and accommodating an electrical machine with a gear stage;
   a shaft directly connected with the variable speed transmission;
   a first connecting shaft connected with the gear stage of the electrical machine and coupled with the shaft
   wherein the variable speed transmission and the independent structural unit with the electric machine and the gear stage are positioned completely within a central longitudinal tunnel arranged on an underbody of the motor vehicle, and the variable speed transmission and the independent structural unit are each secured in the central longitudinal tunnel by separate mountings to a body of the motor vehicle.

2. The drive device of claim 1, wherein the central longitudinal tunnel of the underbody of the motor vehicle in which the variable speed transmission and the independent structural unit with the electric machine and the gear stage are positioned has a constant transverse cross section.

3. The drive device of claim 1, wherein the gear stage is a first gear stage accommodated in the structural unit, said electrical machine having a shaft which is coupled via the first gear stage with the first connecting shaft.

4. The drive device of claim 3, further comprising a first clutch integrated in the structural unit, said electrical machine including a rotor, at least one member selected from the group consisting of the rotor and the first gear stage being disengageable from the variable-speed transmission via the first clutch.

5. The drive device of claim 4, wherein the first clutch is placed between the electrical machine and the first connecting shaft upstream of the first gear stage.

6. The drive device of claim 1, wherein the first connecting shaft is directly connected with the gear stage of the electrical machine.

* * * * *